United States Patent
Tobolski et al.

(10) Patent No.: US 10,140,109 B2
(45) Date of Patent: Nov. 27, 2018

(54) SILENT IN-VEHICLE SOFTWARE UPDATES

(71) Applicant: Ford Global Technologies, LLC, Dearborn, MI (US)

(72) Inventors: Tricia Tobolski, Harrison Township, MI (US); Chad Evert Esselink, Canton, MI (US); Michael Raymond Westra, Plymouth, MI (US); John Thomas Ellis, Orland Park, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 14/189,297

(22) Filed: Feb. 25, 2014

(65) Prior Publication Data

US 2015/0242198 A1    Aug. 27, 2015

(51) Int. Cl.
   *G06F 9/44* (2018.01)
   *G06F 8/65* (2018.01)
   *G06F 8/61* (2018.01)
   *H04L 29/08* (2006.01)

(52) U.S. Cl.
   CPC .............. *G06F 8/65* (2013.01); *G06F 8/61* (2013.01); *H04L 67/10* (2013.01); *H04L 67/34* (2013.01); *H04L 67/12* (2013.01)

(58) Field of Classification Search
   CPC ... G06F 8/61–8/65; H04L 67/10–67/34; H04L 67/12
   See application file for complete search history.

(56) References Cited

U.S. PATENT DOCUMENTS

| | | | | |
|---|---|---|---|---|
| 7,386,698 B2 * | 6/2008 | Gimpl | ................... | G06F 9/5077 711/111 |
| 7,480,907 B1 * | 1/2009 | Marolia | ................... | G06F 8/65 717/127 |
| 7,747,995 B2 * | 6/2010 | Fritsch | ................... | G06F 8/65 709/203 |
| 7,987,449 B1 * | 7/2011 | Marolia | ................... | G06F 8/68 717/120 |
| 8,006,241 B2 * | 8/2011 | Dias | ................... | G06F 8/61 717/173 |
| 8,387,112 B1 | 2/2013 | Ranjan et al. | | |
| 8,555,273 B1 * | 10/2013 | Chia | ................... | G06F 8/654 717/173 |

(Continued)

OTHER PUBLICATIONS

Abdallah Y. Alma'aitah, RFID Tags Authentication by Unique Hash Sequence Detection, 2012, pp. 1-7. http://ieeexplore.ieee.org/stamp/stamp.jsp?arnumber=6424063.*

(Continued)

*Primary Examiner* — Thuy Dao
*Assistant Examiner* — Mongbao Nguyen
(74) *Attorney, Agent, or Firm* — Jennifer M. Stec; Brooks Kushman P.C.

(57) ABSTRACT

A computer-implemented method includes receiving, from a cloud server by a vehicle, a manifest indicating network locations of software updates determined according to an interrogator log generated by the vehicle; installing update binaries retrieved from the network locations to an inactive installation of a plurality of storage installations; and setting the inactive installation to be an active installation upon vehicle restart, in place of another of the storage installation currently set as the active partition.

19 Claims, 6 Drawing Sheets

(56) References Cited

U.S. PATENT DOCUMENTS

| | | | |
|---|---|---|---|
| 2002/0100036 A1* | 7/2002 | Moshir | G06F 8/62 717/173 |
| 2002/0166001 A1* | 11/2002 | Cheng | G06F 8/62 710/1 |
| 2004/0015953 A1* | 1/2004 | Vincent | G06F 8/65 717/173 |
| 2005/0010812 A1* | 1/2005 | Terrell | G06F 11/302 726/4 |
| 2005/0132351 A1* | 6/2005 | Randall | G06F 11/1433 717/168 |
| 2005/0149922 A1* | 7/2005 | Vincent | G06F 8/67 717/172 |
| 2006/0080654 A1* | 4/2006 | Shelton | G06F 8/65 717/173 |
| 2006/0236317 A1* | 10/2006 | Wetherly | G06F 8/65 717/168 |
| 2006/0294514 A1* | 12/2006 | Bauchot | G06F 8/65 717/173 |
| 2008/0028389 A1* | 1/2008 | Genty | G06F 8/61 717/174 |
| 2008/0320466 A1* | 12/2008 | Dias | G06F 8/61 717/171 |
| 2009/0044056 A1* | 2/2009 | Itoh | G06F 11/0733 714/31 |
| 2009/0292891 A1* | 11/2009 | Fujita | G06F 11/2097 711/162 |
| 2010/0057592 A1* | 3/2010 | Moir | G01G 23/3735 705/29 |
| 2010/0058308 A1* | 3/2010 | Demshur | G06Q 10/06 717/168 |
| 2011/0047413 A1* | 2/2011 | McGill | G06F 11/1662 714/15 |
| 2011/0066398 A1* | 3/2011 | Troxler | A01K 15/023 702/150 |
| 2012/0167071 A1* | 6/2012 | Paek | G06F 8/65 717/170 |
| 2012/0311555 A1* | 12/2012 | Nijenkamp | G06F 8/65 717/170 |
| 2013/0014100 A1* | 1/2013 | Akiyama | G06F 11/3612 717/176 |
| 2013/0036415 A1* | 2/2013 | Birtwhistle | G06F 8/65 717/173 |
| 2013/0067450 A1* | 3/2013 | Saugnac | G06F 8/65 717/170 |
| 2013/0072177 A1* | 3/2013 | Ross | G06F 8/61 455/418 |
| 2013/0104186 A1* | 4/2013 | Dietz | H04L 63/10 726/1 |
| 2013/0167134 A1* | 6/2013 | Shim | H04W 12/06 717/173 |
| 2013/0185548 A1* | 7/2013 | Djabarov | H04L 41/082 713/2 |
| 2013/0325323 A1* | 12/2013 | Breed | G01C 21/34 701/420 |
| 2014/0052330 A1* | 2/2014 | Mitchell | G06F 8/65 701/31.5 |
| 2014/0059534 A1* | 2/2014 | Daum | G06F 8/65 717/172 |
| 2014/0095432 A1* | 4/2014 | Trumbull | G06F 17/30 707/610 |
| 2014/0109075 A1* | 4/2014 | Hoffman | G06F 8/65 717/169 |
| 2014/0149454 A1* | 5/2014 | Eid | G06F 17/30725 707/769 |
| 2014/0281465 A1* | 9/2014 | Catherwood | G06F 9/4401 713/2 |
| 2015/0019800 A1* | 1/2015 | Ramirez | G06F 21/572 711/103 |
| 2015/0040113 A1* | 2/2015 | Muench-Casanova | G06F 9/4406 717/168 |
| 2015/0169311 A1* | 6/2015 | Dickerson | G06F 8/65 717/170 |
| 2015/0220321 A1* | 8/2015 | Jung | H04L 67/12 717/169 |

OTHER PUBLICATIONS

Haibo Chen, Dynamic Software Updating Using a Relaxed Consistency Model, 2011, pp. 679-693 https://ieeexplore.ieee.org/stamp/stamp.jsp?tp=&arnumber=5551162 (Year: 2011)*

Rajiv Ranjan, Peer-to-Peer-Based Resource Discovery in Global Grids: A Tutorial, 2008, pp. 6-29. https://ieeexplore.ieee.org/stamp/stamp.jsp?tp=&arnumber=4564477 (Year: 2008)*

Rodrigo Rodrigues, Automatic Reconfiguration for Large-Scale Reliable Storage Systems, 2012, pp. 145-157. http://www.pmg.csail.mit.edu/papers/tdsc12.pdf (Year: 2012)*

Amol Khedkar, Flash-Based Logging for Database Updates, 2011, pp. 540-546 https://ieeexplore.ieee.org/stamp/stamp.jsp?tp=&arnumber=5928734 (Year: 2011)*

* cited by examiner

SILENT IN-VEHICLE SOFTWARE UPDATES

TECHNICAL FIELD

The illustrative embodiments generally relate to a method and apparatus for tailored wireless module updating.

BACKGROUND

Vehicular software systems are becoming ever increasingly complex. Many vehicles now on the road have numerous software modules associated therewith. Powertrain control, infotainment, navigation and a number of other systems are controlled by hardware and software. Given the complex nature of these systems, and the number of software and hardware components, there are frequently updates that could be useful to vehicle owners. To address the complexity, a remote operator may be utilized to assist with the software updates. However, such approaches may require the vehicle owner's attention, which may cause the vehicle owner to defer the performance of vehicle software updates.

SUMMARY

In a first illustrative embodiment, a computer-implemented method includes receiving, from a cloud server by a vehicle, a manifest indicating network locations of software updates determined according to an interrogator log generated by the vehicle; installing update binaries retrieved from the network locations to an inactive installation of a plurality of storage installation; and setting the inactive installation to be an active installation upon vehicle restart, in place of another of the storage installation currently set as the active installation.

In a second illustrative embodiment, a system includes at least one controller configured to receive, from a cloud server by a vehicle, a manifest indicating network locations of software updates determined according to an interrogator log generated by the vehicle; install update binaries retrieved from the network locations to an inactive installation of a plurality of storage installation; and set the inactive installation to be an active installation upon vehicle restart, in place of another of the storage installation.

In a third illustrative embodiment, a non-transitory computer readable storage medium, stores instructions that, when executed by at least one controller, cause the at least once controller to receive, from a cloud server by a vehicle, a manifest indicating network locations of software updates determined according to an interrogator log generated by the vehicle; install update binaries retrieved from the network locations to an inactive installation of a plurality of storage installation; and set the inactive installation to be an active installation upon vehicle restart, in place of another of the storage installation.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A system may be configured to perform silent over-the-air updates of software modules. The system may install the updates into a parallel software installation separate from an active software installation (such as a partition other than the active software partition or a parallel set of files and/or directories other than an active set of files). When the installation is complete, the system may switch the active software installation to be the second parallel software installation. In some cases, the system may provide a notification to the user that the software has been updated. This allows for the software to be updated without requiring customer interaction to invoke the update process, and without causing the customer to be unable to utilize the software systems while an update is being performed.

To determine what modules to update, a vehicle module may be configured to generate the interrogator log including version information of at least one software module installed on the vehicle, and to send the interrogator log to a cloud server. The vehicle module may identify to generate the interrogator log based upon criteria such as determining that a predetermined number of key-on cycles have been completed by the vehicle, determining that a specified amount of time has passed since an interrogator log has been generated, or a combination of both. The interrogator log may include information compiled in accordance with a data identifier list defining what information to include in the interrogator log interrogate and where such information is located in the active software installation. The vehicle may be configured to receive a manifest from the cloud server, based on the information included in the provided interrogator log, indicating network locations of at least one software update to be installed by the vehicle. Based on the manifest, the vehicle may be configured to install updated binaries retrieved from the specified network locations to an inactive installation. When the inactive installation has been updated, the vehicle may be configured to set the inactive installation to be the active installation (e.g., a boot partition) in place of the previously active installation. Thus, upon vehicle restart, the software of the updated installation may be used.

Figure 1:
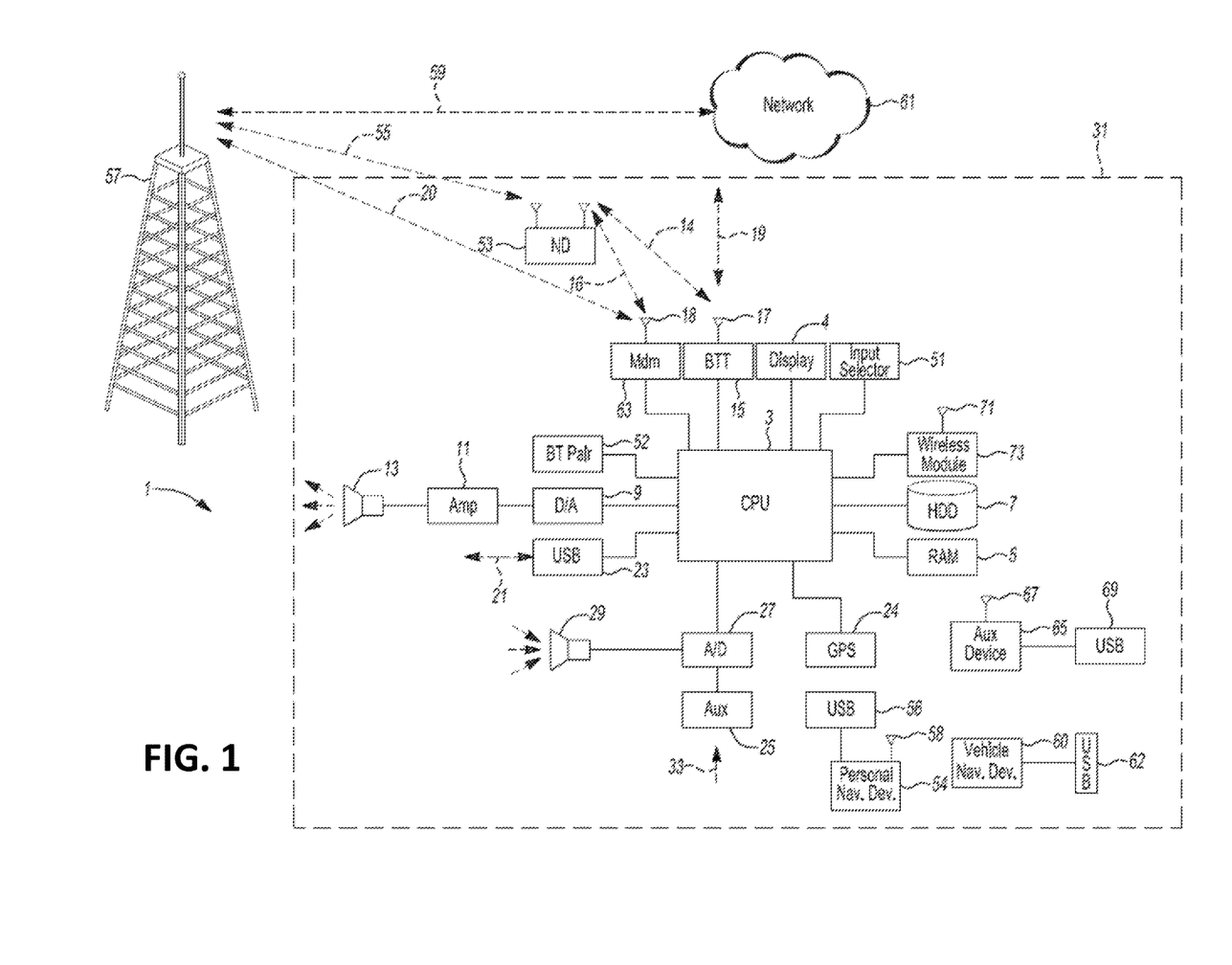
FIG. 1 illustrates an example block topology for a vehicle-based computing system for a vehicle.

FIG. 1 illustrates an example block topology for a vehicle-based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 or central processing unit (CPU) 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, HDDs, compact disks (CDs), digital versatile disks (DVDs), magnetic tapes, solid state drives, portable universal serial bus (USB) drives and any other suitable form of persistent storage 7.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, a screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a car area network (CAN) bus) to pass data to and from the VCS 1 (or components thereof).

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a nomadic device (ND) 53 (e.g., cell phone, smart phone, PDA, or any other device having wireless remote network connectivity). The nomadic device 53 can then be used to communicate 59 with a network 61 outside the vehicle 31 through, for example, communication 55 with a cellular tower 57. In some embodiments, tower 57 may be a WiFi access point.

Exemplary communication between the nomadic device 53 and the BLUETOOTH transceiver is represented by communication 14.

Pairing a nomadic device 53 and the BLUETOOTH transceiver 15 can be instructed through a button 52 or similar input. Accordingly, the CPU is instructed that the onboard BLUETOOTH transceiver 15 will be paired with a BLUETOOTH transceiver in a nomadic device 53.

Data may be communicated between CPU 3 and network 61 utilizing, for example, a data-plan, data over voice, or dual-tone multiple frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the Institute of Electrical and Electronics Engineers (IEEE) 802 personal area network (PAN) protocols. IEEE 802 local area network (LAN) protocols include wireless fidelity (WiFi) and have considerable cross-functionality with IEEE 802 PAN. Both are suitable for wireless communication within a vehicle 31. For example, BLUETOOTH and WiFi may be utilized as transport to provide communication between the processor 3 and mobile applications executed by a nomadic device 53, supporting technologies such as SYNC APPLINK provided by THE FORD MOTOR COMPANY. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (290 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 31. 3G standards are now being replaced by IMT-Advanced (4G) which offers 200 mbs for users in a vehicle 31 and 1 gbs for stationary users. If the user has a data-plan associated with the nomadic device 53, it is possible that the data-plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless LAN device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the processor 3 of the vehicle 31. In the case of certain temporary data, for example, the data can be stored on the HDD or other storage media 7 until such time as the data is no longer needed.

Additional sources that may interface with the vehicle 31 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1298 (Centronics Port), S/PDIF (Sony/Philips Digital Interconnect Format) and USB-IF (USB Implementers Forum) form the backbone of the device-device serial standards.

Most of the protocols can be implemented for either electrical or optical communication.

Further, the CPU 3 could be in communication with a variety of other auxiliary devices 65. These devices 65 can be connected through a wireless 67 or wired 69 connection. Auxiliary device 65 may include, but are not limited to, personal media players, wireless health devices, portable computers, and the like.

Also, or alternatively, the CPU 3 could be connected to a vehicle-based wireless router 73, using for example a WiFi (IEEE 803.11) 71 transceiver. This could allow the CPU 3 to connect to remote networks within range of the local router 73.

In addition to having exemplary processes executed by a vehicle computing system located in a vehicle 31, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 itself is capable of performing the exemplary processes.

Figure 2A:
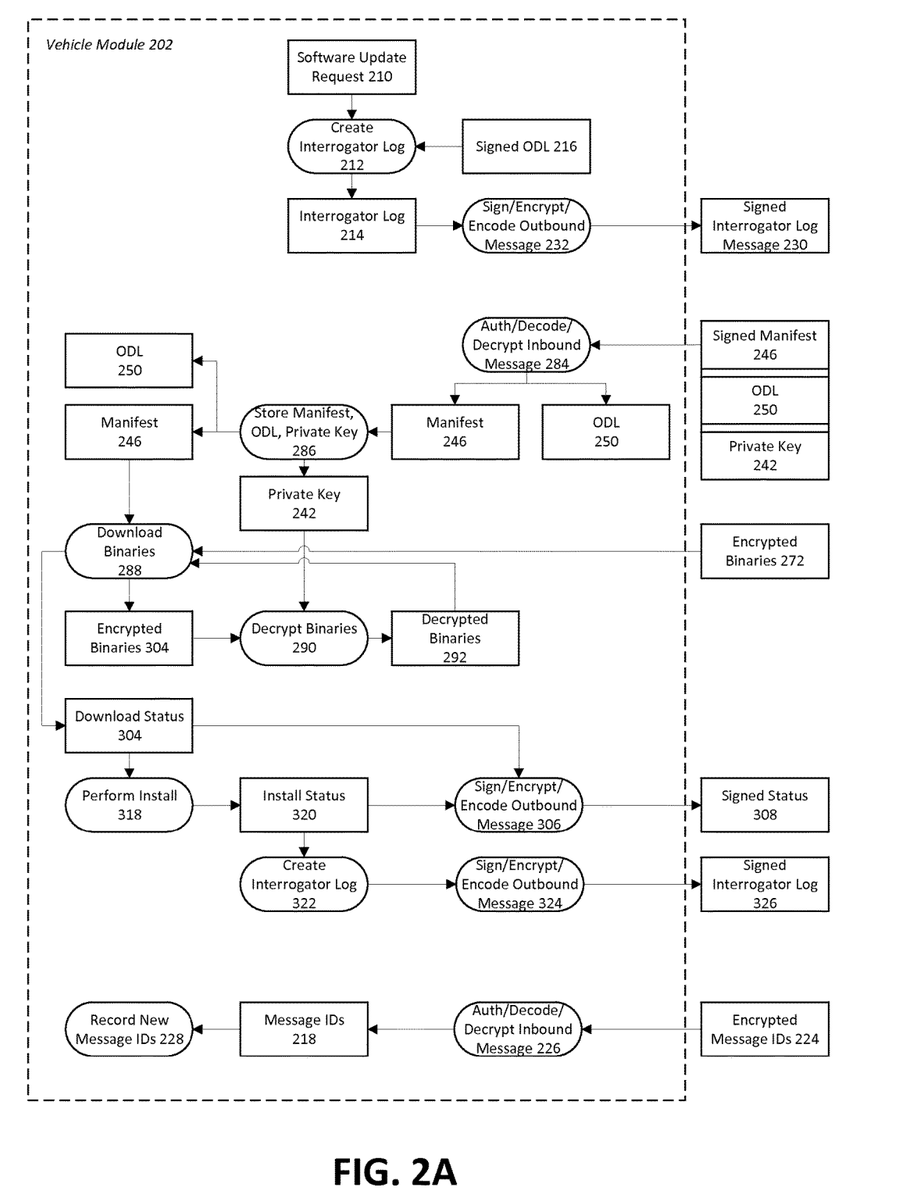
FIGS. 2A-2D show an illustrative system for silent module software updates.
Figure 2B:
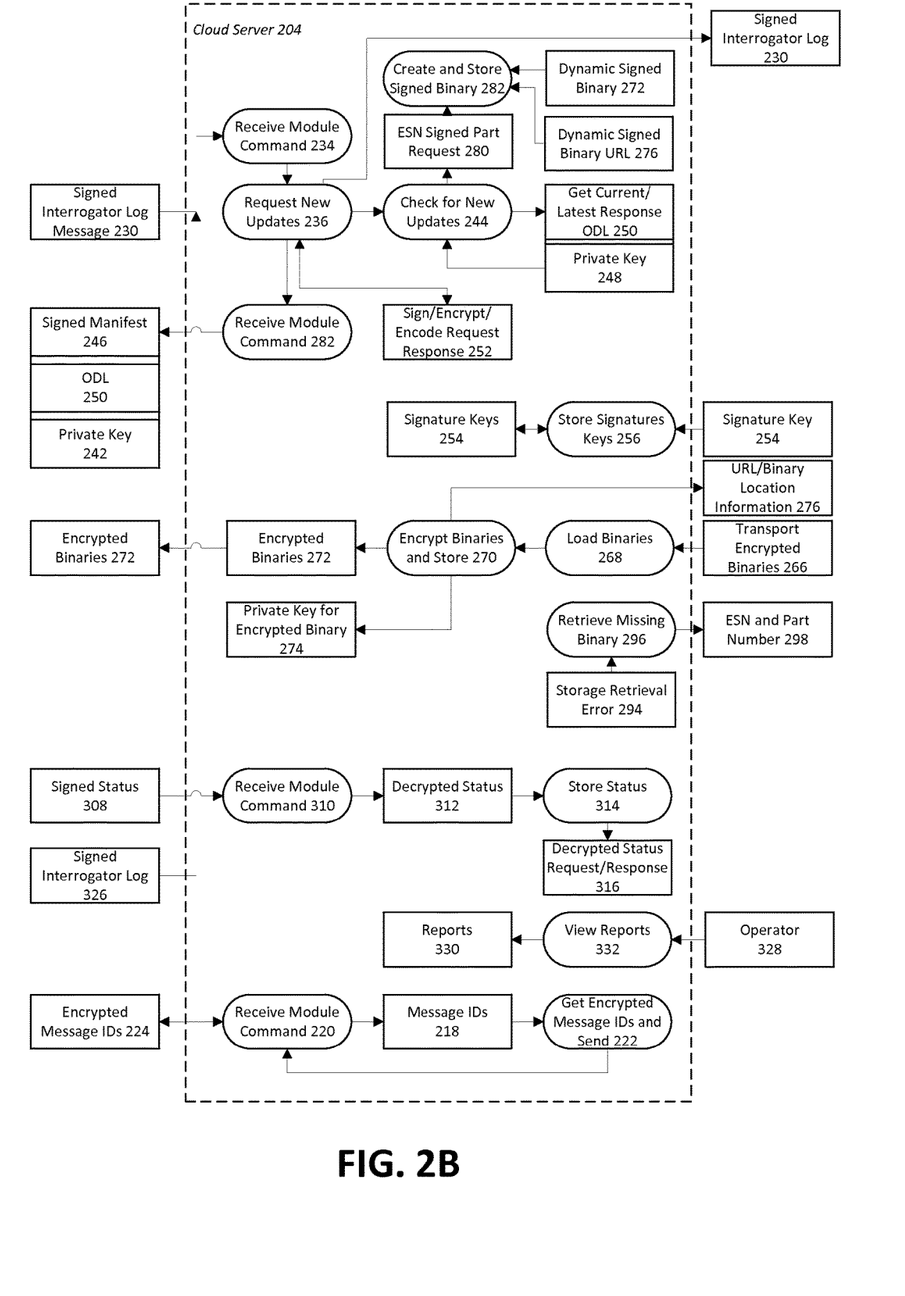
Figure 2C:
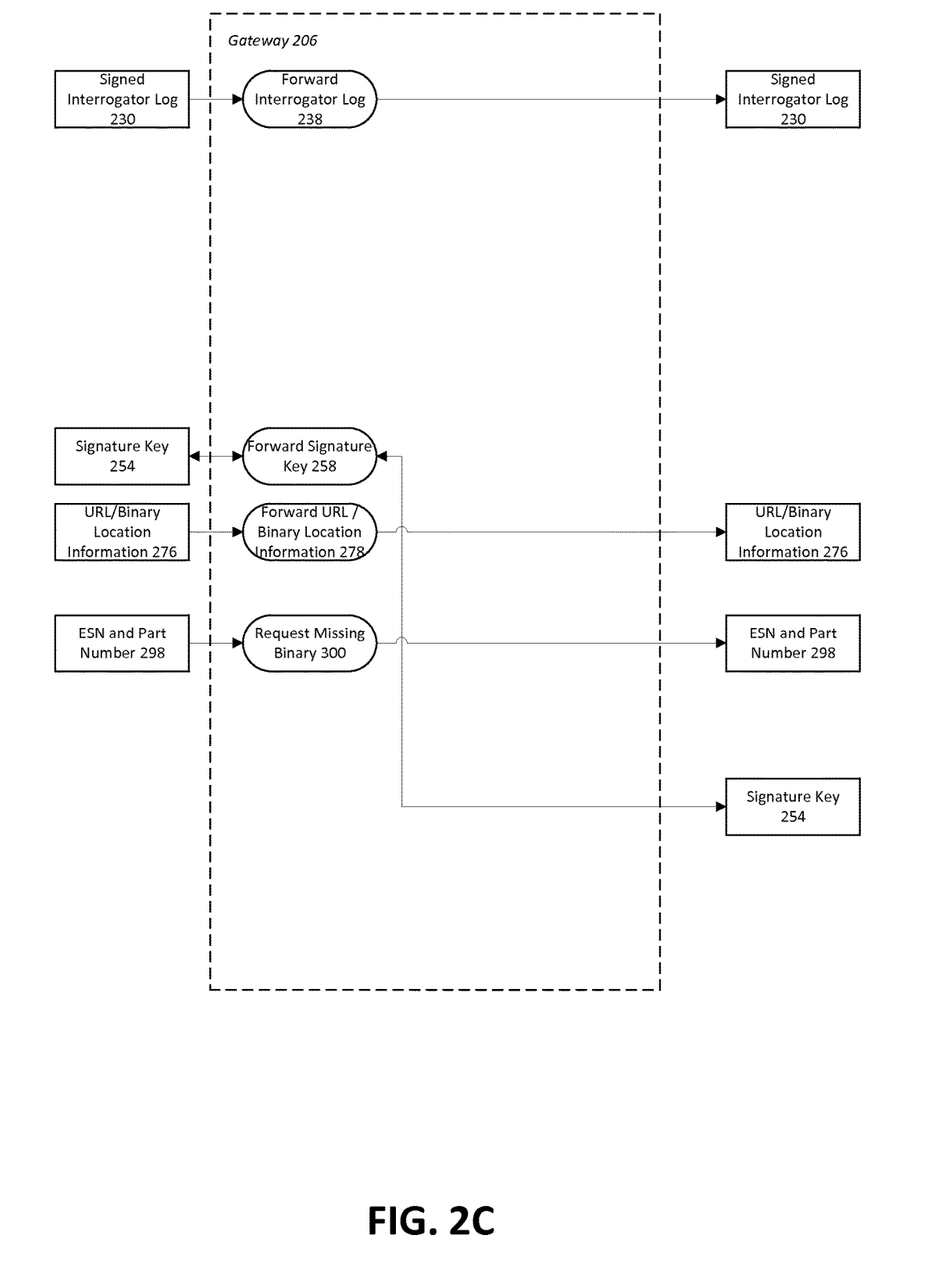
Figure 2D:
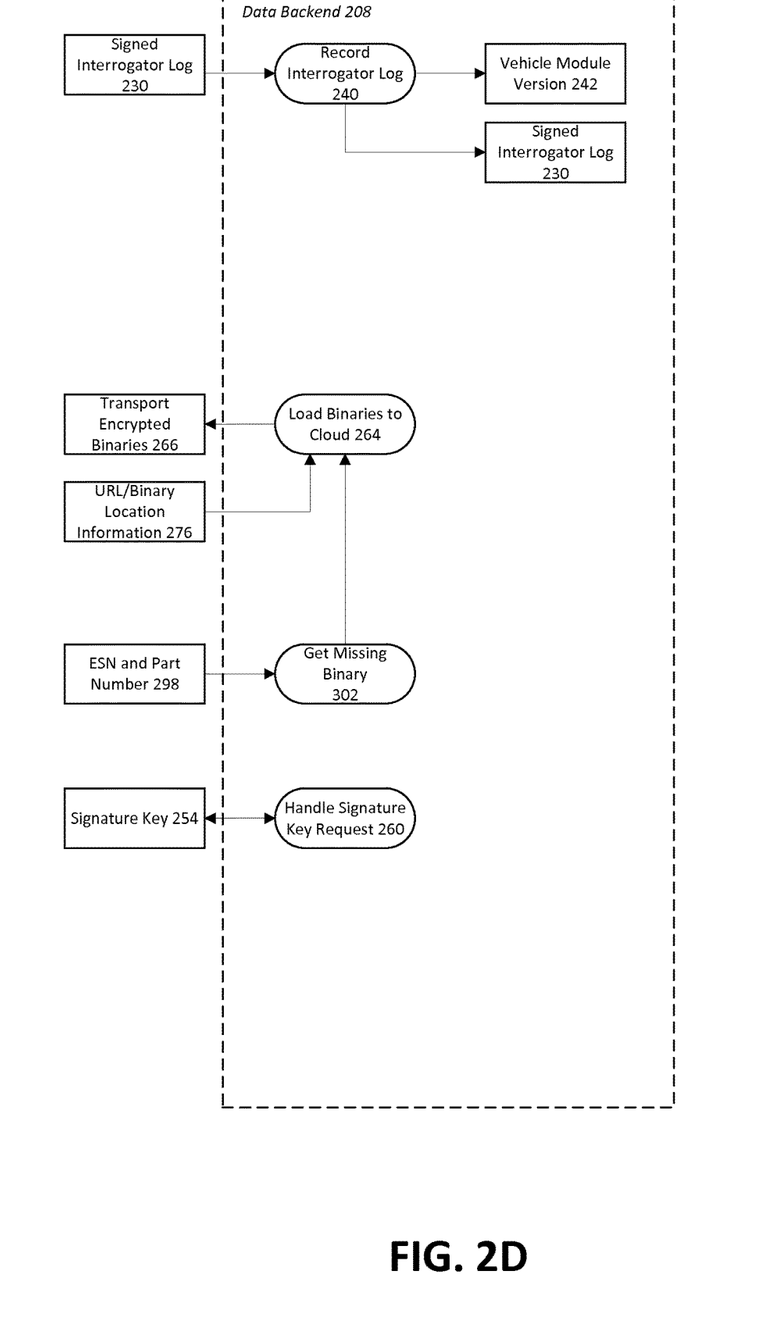

FIGS. 2A-2D show an illustrative system 200 for silent module software updates. FIG. 2A shows a vehicle module 202 portion of the illustrative system 200; FIG. 2B shows a cloud server 204 portion of the system 200; FIG. 2C shows a gateway 206 portion of the system 200; and FIG. 2D shows a data backend 208 portion of the system 200. The vehicle module 202 of the vehicle 31 may be configured to utilize the services of the system 200 to perform updates to the software of the vehicle 31. The cloud server 204 may be configured to handle requests for software updates from the vehicle module 202 and provide downloads of software updates to the vehicle module 202. The gateway 206 may be configured to provide controlled access to the data backend 208 from other system 200 elements. The data backend 208 may be configured to provide data storage of software binaries and vehicle 31 information secured behind the gateway 206.

More specifically, and referring to FIG. 2A, a user or vehicle 31 may opt into silent software updates being performed by the vehicle 31. To facilitate the opt-in process, in some examples a vehicle module 202 may provide a prompt to the user via a visual display 4 and/or speaker 13 of the system requesting the user's authorization. The vehicle module 202 may be an infotainment module or other in-vehicle module for which silent software updates may be desirable. An exemplary prompt may request the user to consent to over-the-air updates to be performed via WiFi. The consent may be requested once, but utilized across multiple update cycles. As another possibility, the user may opt into over-the-air updates using a nomadic device 53 paired or otherwise associated with the vehicle 31 (e.g., by providing consent via a mobile application executed by the nomadic device 53, via sending an short message service (SMS) message from the nomadic device 53 to a specific number, by use of an authorization webpage accessible from the nomadic device 53, etc.). Once authorized (e.g., by way of receiving button presses or spoken dialog from the user), the vehicle module 202 may be configured to generate a software update request 210 to cause the vehicle module 202 to query for software updates of modules of the vehicle 31. This querying may be performed silently, and without requiring user input. The querying may further be performed according to satisfaction of one or more conditions, such as after a predetermined number of key-ons of the vehicle 31 have been performed. If a connection (e.g., a connection of the vehicle 31 to a WiFi network) is not available at the key on event, the vehicle module 202 may wait to perform the interrogation specified by the software update request 210 upon the next available connection.

The vehicle module 202 may be configured to collect information 212 related to the modules of the vehicle 31. The process of collecting data may be referred to as interrogation, and the collected data may be referred to as an interrogator log 214. The information to interrogate may include, as some non-limiting examples, module name, module serial number, VIN, hardware part number, MAC address, part numbers of software applications, languages, and service packs installed on the module, available storage space on the module, and status information regarding the installation of previous updates. The vehicle module 202 may be further configured to determine what information to collect by use of an optimized data identifier list (ODL) file 216 defining the specific information to interrogate and where such information may be located. Notably, the information to collect may include data elements from other engine control units or other controllers of the vehicle 31, and may be retrieved via the controller area network (CAN) or other vehicle 31 communication architecture supporting data transfer between controllers. The information may also include diagnostic trouble codes, and other vehicle state information that may be collected during vehicle servicing by a dealer. The information may also include analytics data including usage and logging data providing insight into usage of various vehicle features. In some cases, the ODL file 216 may be installed as part of an installation of software on the vehicle module 202, while in other cases the ODL file 216 may have been previously received according to earlier performed updates (described in greater detail below). As yet a further example, the vehicle module 202 may be configured to send the vehicle 31 VIN or other identifying information to the cloud server 204, and receive an ODL file 216 defining what information to interrogate for the particular VIN.

As an additional level of security, the system 200 may utilize message IDs 218 to validate messages sent to the cloud server 204 from the vehicle module 202. More specifically, the vehicle module 202 may sent a request to the cloud server 204 to receive message IDs 218 for use in sending verifiable messages to the cloud server 204. Referring to FIG. 2B, the cloud server 204 may receive 220 the request, and may generate or otherwise look up the message IDs 218 for the vehicle module 202 to use. The cloud server 204 may encrypt 222 the message IDs 218, and may return the encrypted message IDs 224 to the vehicle module 202. Message IDs 218 may be utilized, for example, in situations in which the cloud server 204 identifies a possible replay attack by a party attempting to repeat a captured message sent from a vehicle module 202. Thus, the cloud server 204 may validate messages received from the vehicle module 202 to ensure that they use message IDs 218 that are valid (e.g., not previously used) for the system 200 and/or for the vehicle module 202 or vehicle 31. Referring back to FIG. 2A, the vehicle module 202 may be further configured to receive the encrypted message IDs 224, decrypt 226 the message IDs 224 into message IDs 218, and record the new message IDs 228 for use by the vehicle module 202.

The vehicle module 202 may be further configured to include the interrogator log 214 in a message 230 to be sent to the cloud server 204. In some cases, if a connection is not available when the interrogator log 214 is complete, the message 230 including the interrogator log 214 may be passed to the cloud server 204 during the next available connection to the vehicle 31. The vehicle module 202 may be further configured to sign 232 the message 230 using a module key associated with the vehicle module 202. The vehicle module 202 may be further configured to perform a secure encoding of the message 230, such as by encrypting the message 230 according to a private key used in a protocol for the transfer of messages to and from the vehicle 31. In general, messages sent from the vehicle module 202 to the cloud server 204 may be signed, encrypted, and encoded by the vehicle module 202, and messages received from the cloud server 204 by the vehicle module 202 may be authenticated, decrypted, and decoded by the vehicle module 202.

As a possible pass-through technique, the vehicle module 202 may be configured to send the message 230 to a nomadic device 53 (e.g., connected to the vehicle 31 over BLUETOOTH or over WiFi), to pass the message 230 on the cloud server 204. For example, if the vehicle 31 is connected to the nomadic device 53 over a WiFi network, then the vehicle module 202 may elect to send the message 230 to the nomadic device 53 via WiFi. Or, if the vehicle 31 is connected to the nomadic device 53 via BLUETOOTH, then the vehicle module 202 may provide the message 230 to via BLUETOOTH to be provided to the cloud server 204 by the nomadic device 53. It should be noted that transfer of other messages sent between the vehicle module 202 and the cloud server 204 may be similarly performed.

Referring to FIG. 2B, the cloud server 204 may be configured to receive 234 the message 230 including the interrogator log 214, either via the mobile phone or via WiFi from the vehicle 31. Regardless of which approach is used to receive the message 230, the cloud server 204 may be configured to validate the interrogator log 214, and, if the log 214 is validated, request new updates 236 for the vehicle 31. The validations of the log 214 may include, as one example, ensuring that the log 214 is in the proper format, that the log 214 is of an appropriate length, and that the log 214 does not contain any invalid characters, as some examples.

As one aspect of requesting the updates 236, and referring to FIGS. 2C and 2D, the cloud server 204 may forward 238 the signed log 230 to the data backend 208 via the gateway 206 to allow the data backend 208 to record 240 the interrogator log 230 to keep track of the current installation status of the vehicle 31, such as the version 242 and configuration of the vehicle module 202 and other modules of the vehicle 31, as well as to maintain a copy of interrogator log 230 itself.

Referring back to FIG. 2B, as another aspect of requesting the updates 236, the cloud server 204 may check for new updates 244 to the vehicle 31 software that may be required. The cloud server 204 may be configured to review the current module configuration indicated by the interrogator log 230 and current version of the vehicle module 202, and determine whether any software updates to the vehicle 31 should be installed. Based on the determination, the cloud server 204 may identify binaries that should be installed on the vehicle 31 to perform the identified updates. These binaries may be identified in a manifest 246. Moreover, the manifest 246 may specify network locations at which each of the specified update binaries may be retrieved. As one example, the manifest 246 may specify the network locations as URLs served by the cloud server 204. In some cases, the binaries may include new versions of files to be installed, while in other cases, the binaries may include incremental updates to be applied to currently installed binaries to update the currently installed binaries from one version to a next version.

To identify the software updates, the cloud server 204 may be configured to compare the current versions of modules indicated in the interrogator log 230 with the latest version of the modules compatible with the vehicle module 202. The cloud server 204 may be further configured to identify, for any components that should be updated, any additional dependencies that those updated versions may require. Those additional dependencies may further be added to the manifest 246.

The cloud server 204 may provide a message in response to the identification of software updates for the vehicle 31. The message may include the manifest 246, as well as additional information, such as one or more private keys 248 that may be used by the vehicle 31 to decrypt software updates to be downloaded according to the manifest 246, and a response indicative of the current or latest version information 250. The current or latest version information 250 may include, for example, updated ODL 250 including new definitions of what information to be interrogated the next time an update is performed.

The cloud server 204 may, as a further part of the request for new updates 236, perform encryption 252 of the response to be provided back to the vehicle module 202. For example, the cloud server 204 may perform encoding/encryption 252 of requests according to signature keys 254 received from the data backend 208 and stored 256 by the cloud server 204. Referring to FIGS. 2C and 2D, the data backend 208 in turn may be configured to handle key signature requests 260, and provide the signature key 254 to the cloud server 204, forwarded 258 via the data gateway 206. Referring back to FIG. 2B and using the signature keys 254, the cloud server 204 may accordingly provide the signed, encoded, encrypted response back 262 to the requesting vehicle module 202, responsive to the original vehicle module 202 request for updates sent at 232 as referenced in FIG. 2A. While returned 262 in response, it should be noted that the vehicle module 202 is not required to synchronously wait or hang waiting for the manifest 246 to be received in response to the original request. As discussed in detail below beginning with element 284, the vehicle module 202 may utilize the information included in the response to complete the software update.

Returning to the data backend 208 processing in FIG. 2D, the data backend 208 may load 264 updated binaries to the cloud server 204 to be downloaded by the vehicle module 202. As one possibility, the data backend 208 may be configured to periodically (e.g., daily, weekly, monthly) load 264 binaries to the cloud server 204. As another possibility, the data backend 208 may be configured to provide updates to the cloud server 204 based on an identified need (e.g., to fix a software bug, a critical or emergency issue, in response to a request for vehicle 31 software updates, etc.).

Referring to FIGS. 2B and 2D, to provide security for the binaries during network transport to the cloud server 204, the binaries may be transmitted in a transport encryption format as transport encrypted binaries 266. The cloud server 204 may accordingly load 268 the binaries 266 in a decrypted format decoded according to the transport protocol. As the binaries are not in an encrypted format once they are received via the transport, the cloud server 204 may be configured to encrypt 270 the binaries as generic encrypted binaries 272 for storage, where the generic binaries are encoded using private keys 274 that are not keyed to a particular vehicle 31 or VIN. Thus, the encrypted binaries 272 may be decrypted using private keys 274 provided to the vehicle modules 202. The encrypted binaries 272 may accordingly be made available at generic binary network locations 276 that may be specified by the manifest 246 provided to the vehicle 31. In some cases, the binaries that are requested are signed in a manner to be keyed to a private key 274 of a particular requester or downloader (e.g., vehicle 31). These requests may be referred to as electronic serial number (ESN) signed part requests 280, and may be performed at create and store signed binary element 282. For example, the cloud server 204 may determine dynamic signed binary URLs 276 for dynamic signed binaries 272, and generic signed binary URLs 276 for generic signed binaries 272. As part of the sign and encrypt 270 processing and/or the create and store signed binary 282 processing, the binary URL 276 information may be forwarded 278 via the gateway 206 to the data backend 208, to allow the data backend 208 to be informed of the locations of the loaded binaries.

Referring to FIG. 2A, responsive to element 282, the vehicle module 202 may receive the response including a signed manifest 246, private keys 248 and updated ODL 250, and may authenticate, decode and decrypt 284 the response. Accordingly, the vehicle module 202 may extract the included manifest 246, private keys 248 and ODL 250. The vehicle module 202 may further store 286 the manifest 246, private keys 248, and ODL 250. Based on the manifest 246, the vehicle module 202 may be configured to download 288 the indicated binaries 272. For example, by accessing network locations specified by the manifest 246, the vehicle module 202 may be configured to download binaries 272 from the cloud server 204. Using the private keys 248, the vehicle module 202 may be configured to decrypt 290 the binaries 272 into decrypted binaries 292 for installation.

In some cases, the vehicle module 202 may request a binary from the cloud server 204 that the cloud server 204 is not hosting. Referring to FIG. 2B, the cloud server 204 may detect the storage retrieval error 294, e.g., upon receiving a request directed to a URL or other network location for which no file is hosted by the cloud server 204. Responsive to the detection, the cloud server 204 may retrieve the missing binary 296. As one possibility, the cloud server 204 may provide the ESN and/or part number 298 of the missing binary to the gateway 206, which may in turn forward 300 the requested number 298 to the data backend 208. The data backend 208 may accordingly perform a get 302 of the missing binary, similar to the loading 264 of binaries to the cloud server 204 based on a check for new updates 244.

Returning to FIG. 2A, the vehicle module 202 may also maintain a download status 304 indicative of the progress of the vehicle module 202 in retrieving the software updates specified by the manifest 246. To allow the data backend 208 to be automatically apprised of the status of the download, the vehicle module 202 may provide a download status 304 to the cloud server 204. The vehicle module 202 may accordingly sign, encrypt, and encode 306 the status 304 similar to as discussed above with respect to the providing of the signed interrogator logs 230 in element 232. The signed status 308 may be provided to the cloud server 204, which, referring to FIG. 2B, may receive 310 the request. The cloud server 204 may retrieve out the decrypted status 312, and may store 314 the decrypted status 316 to allow the system 200 to keep track of the progress of the vehicle module 202. Accordingly, the vehicle module 202 may provide error information to the cloud server 204 for binaries that could not be downloaded, or that could be downloaded but could not be decrypted using the private keys 248. From the cloud server 204, the status 304 updates may in some cases be forwarded to data backend 208 (not shown), to allow data backend 208 to stay updated with the download status 304 of the vehicle module 202.

Referring back to FIG. 2A, the vehicle module 202 may be configured to install 318 the downloaded and decrypted binaries 292. To avoid disruption of the current version of software installed to the vehicle module 202, the vehicle module 202 may be configured to perform the installation to a second installation of the vehicle module 202, other than the currently active installation from which the vehicle module 202 was booted. The installation of the modules to the second installation may be performed silently, without requiring input from the user. Similar to as done for the downloading of the binaries, as modules are installed to the vehicle module 202, the vehicle module 202 may be configured to provide install status 320 updates to the cloud server 204. From the cloud server 204, the status updates may be forwarded to data backend 208, to allow data backend 208 to stay updated with the status 320 of the installed module versions of the vehicle module 202.

Upon completion of installation of the modules specified by the manifest, the vehicle module 202 may be configured to perform an additional interrogation of the modules of the vehicle 31 to create an interrogator log 322. Similar to as describe above with respect to element 294, the vehicle module 202 may create the interrogator log 322, but this time utilizing the received ODL 250, providing an updated definition of what information to interrogate for the currently performed software update. Also, similar to as discussed above, the vehicle module 202 may be configured to sign, encode, and provide 324 the interrogator log 326 to the cloud server 204, which in turn may provide the interrogator log 326 to the data backend 208 (similar to as done with the interrogator log 230). Accordingly, data backend 208 may be automatically updated of the installation status of the vehicle 31, without requiring user HMI interaction.

Also upon completion of the software installation, the vehicle module 202 may be configured to reconfigure the vehicle module 202 to indicate that the second installation is the new active installation (e.g., a partition to be booted). Accordingly, the next time that the vehicle module 202 is started, such as upon the next key-on, the updates software may be made available for use by the vehicle 31. In some cases, the user may be notified that the software installation is completed. Moreover, upon successful boot of the vehicle 31 into the second installation, the first installation may then also be updated to the new software version. Accordingly, the first installation may then be available for the silent installation of future software updates to the vehicle 31.

Referring to FIG. 2B, an operator 328 of the system 200 may utilize the system 200 to generate reports 330 relating to the current module versions of software installed on the vehicle(s) 31, which may be viewed 332 by the operator 328. As one example, the reports 330 may include information regarding the status of vehicle updates for a vehicle 31 (e.g., queried according to VIN or another vehicle-specific identifier) that may indicate whether the vehicle 31 has completed downloading software updates, completed installation of software updates, or has suffered issues when attempting to perform software updates using the system 200. As another example, the reports 330 may include statistics regarding which vehicles 31 are at what installed version levels for various modules.

Figure 3:
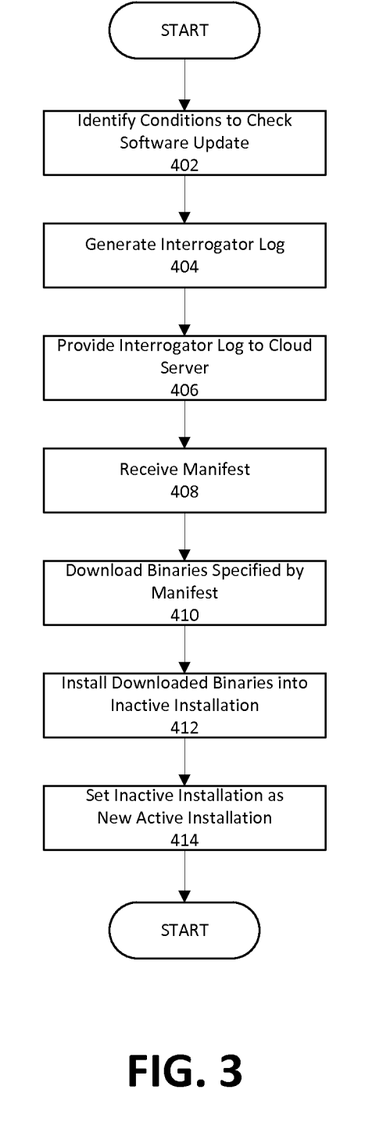
FIG. 3 illustrates an exemplary process for the updating of vehicle software.

FIG. 3 illustrates an exemplary process 400 for the updating of vehicle software. The exemplary process 400 may be performed, for example, by a vehicle 31 in communication with a cloud server 204.

At block 402, the vehicle 31 determines that the vehicle 31 should check for software updates. For example, upon determining that a predetermined number of key-on cycles have been completed by the vehicle 31 and/or an amount of time has elapsed, and further that a network connection is available to communicate to a cloud server 204 (e.g., via a connected nomadic device 53), the vehicle module 202 of the vehicle 31 may determine that the vehicle 31 should check for software updates.

At block 404, the vehicle 31 generates an interrogator log 214. The interrogator log 214 may include version information of at least one software module installed on the vehicle 31. The information to interrogate may include, as some non-limiting examples, module name, module serial number, VIN, hardware part number, MAC address, part numbers of software applications, languages, and service packs installed on the module, available storage space on the module, and status information regarding the installation of previous updates. The vehicle module 202 may be configured to generate the interrogator log 214 according to an ODL 216 defining what information to interrogate and where such information may be located. The information to interrogate may include, for example, requested identifiers from the vehicle module 202 and other ECUs within the vehicle. The information may be gathered via the CAN or other vehicle network, and included in the interrogator log 214. In some cases, the ODL 216 may be received as part of an installation of software on the vehicle module 202, while in other cases the ODL 216 may have been previously received according to earlier performed updates, e.g., as ODL 250.

At block 406, the vehicle 31 provides the interrogator log 214 to the cloud server 204. For example, the vehicle module 202 may encrypt the interrogator log 214, and may send a signed interrogator log message 230 to the cloud server 204.

At block 408, the vehicle 31 receives a manifest 246 from the cloud server 204. For example, responsive to the message 230, the vehicle module 202 of the vehicle 31 may receive a signed manifest 246 indicating one or more binaries to be downloaded and installed by the vehicle 31, as well as other information to use when performing the update, such as updated ODL 250 and private keys 248 to decrypt the binaries to be downloaded and installed.

At block 410, the vehicle 31 downloads the binaries specified by the manifest 246. For example, the vehicle module 202 of the vehicle 31 may download encrypted binaries 272 from the cloud server 204 from at network locations specified by the manifest 246, and may decrypt the binaries 272 into decrypted binaries 292 according to the received private keys 248.

At block 412, the vehicle 31 installs the downloaded binaries into an inactive installation. For example, the vehicle module 202 may utilize software executing in the active installation to install the decrypted binaries 272 into an inactive installation that is also at the current software version as the active installation. The may allow the installation to occur without affecting the functioning of the vehicle module 202.

At block 414, the vehicle 31 sets the inactive installation to be the new active installation. For example, if the installation is successful, the vehicle module 202 may alter the boot information for the vehicle module 202 to set the inactive installation to be the new active installation up on the next boot. In some cases, the vehicle module 202 may force a reboot of the vehicle module 202, while in other cases the vehicle module 202 may allow the reboot to be delayed until the next time the vehicle module 202 is booted (e.g., upon the next key-on cycle of the vehicle 31). Upon the next boot, if the software update is successful, the vehicle module 202 may update the former active installation to match the new version of the software as well. If, however, the reboot fails, the vehicle module 202 may be able to gracefully fall back to the previous active installation (and in some cases roll back the failed changes to the inactive installation as well). After block 414, the process 400 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method executed by at least one hardware controller of a vehicle, the method comprising:
   receiving, from a server by a vehicle, a data identifier list defining information to include in an interrogator log and where the information is located in an active software installation;
   generating the interrogator log;
   sending the interrogator log to the server;
   receiving, in response, a manifest indicating network locations of software updates determined according to the interrogator log;
   installing update binaries retrieved from the network locations to an inactive software installation of a plurality of storage installations; and
   setting the inactive software installation to be an active installation upon vehicle restart, in place of another of the storage installations.

2. The method of claim 1, wherein the active software installation includes one of a storage partition and a collection of files within a partition.

3. The method of claim 1, further comprising generating the interrogator log to include at least one of (i) current state information of at least one software module installed on the vehicle or (ii) diagnostic trouble codes of at least one software module installed on the vehicle.

4. The method of claim 3, further comprising generating the interrogator log upon determining that at least one of (i) a predetermined number of key-on cycles has been completed by the vehicle or (ii) a predetermined period of time has passed since interrogator log generation.

5. The method of claim 1, further comprising at least one of:
   (i) providing a notification in a user interface of the vehicle that the inactive software installation will become active upon restart of the vehicle;

(ii) receiving an indication of opt-in from a user interface of the vehicle before allowing silent software updating to be performed; or (iii) receive an indication of opt-in from a user interface of a nomadic device in communication with the vehicle before allowing silent software updating to be performed.

6. The method of claim 1, further comprising:
setting the inactive software installation to replace the active software installation as a new active installation upon vehicle restart; and
updating another storage installation in accordance with the software updates performed to the installation made active.

7. The method of claim 1, wherein the data identifier list is received as part of an installation of downloaded software included in the active software installation.

8. A system comprising:
a data identifier list defining information to include in an interrogator log and on which of a plurality of vehicle controllers the information is located, the data identifier list received as part of an installation of software downloaded from a server to a vehicle; and
at least one hardware controller of the vehicle programmed to
generate the interrogator log based on the data identifier list;
send the interrogator log to the server;
receive, from the server, a manifest indicating network locations of software updates determined according to the interrogator log;
install update binaries retrieved from the network locations to an inactive installation of a plurality of storage installations; and
set the inactive installation to be an active installation upon vehicle restart, in place of another of the storage installations.

9. The system of claim 8, wherein the installation includes one of a storage partition and a collection of files within a partition.

10. The system of claim 8, wherein the at least one controller is further configured to generate the interrogator log to include at least one of
(i) current state information of at least one software module installed on the vehicle or (ii) diagnostic trouble codes of at least one software module installed on the vehicle.

11. The system of claim 10, wherein the at least one controller is further configured to generate the interrogator log upon determining that at least one of (i) a predetermined number of key-on cycles have been completed by the vehicle or (ii) a predetermined period of time has passed since interrogator log generation.

12. The system of claim 8, wherein the at least one controller is further configured to at least one of:
(i) provide a notification in a user interface of the vehicle that the inactive installation will become active upon restart of the vehicle;
(ii) receive an indication of opt-in from a user interface of the vehicle before allowing silent software updating to be performed; or (iii) receive an indication of opt-in from a user interface of a nomadic device in communication with the vehicle before allowing silent software updating to be performed.

13. The system of claim 8, wherein the at least one controller is further configured to update another of the storage installation in accordance with the software updates performed to the installation made active.

14. A non-transitory computer readable storage medium, storing instructions that, when executed by at least one hardware controller of a vehicle, cause the at least one hardware controller to:
receive, from a cloud server by the vehicle, a data identifier list defining information to include in an interrogator log and where on a plurality of vehicle controllers the information is located;
generate the interrogator log based on the data identifier list;
send the interrogator log to the server;
receive, from the server, a manifest indicating network locations of software updates determined according to the interrogator log;
install update binaries retrieved from the network locations to an inactive installation of a plurality of storage installations; and
set the inactive installation to be an active installation upon vehicle restart, in place of another of the storage installations.

15. The computer readable medium of claim 14, wherein the installation includes one of a storage partition and a collection of files within a partition.

16. The computer readable medium of claim 14, further storing instructions that when executed cause the at least one hardware controller to generate the interrogator log, based on the data identifier list, to include at least one of (i) current state information of at least one software module installed on the vehicle or (ii) diagnostic trouble codes of at least one software module installed on the vehicle.

17. The computer readable medium of claim 16, further storing instructions that when executed cause the at least one hardware controller to generate the interrogator log upon determining that at least one of (i) a predetermined number of key-on cycles has been completed by the vehicle, or (ii) a predetermined period of time has passed since interrogator log generation.

18. The computer readable medium of claim 14, further storing instructions that when executed cause the at least one hardware controller to at least one of:
(i) provide a notification in a user interface of the vehicle that the inactive installation will become active upon restart of the vehicle;
(ii) receive an indication of opt-in from a user interface of the vehicle before allowing silent software updating to be performed; or
(iii) receive an indication of opt-in from a user interface of a nomadic device in communication with the vehicle before allowing silent software updating to be performed.

19. The computer readable medium of claim 14, further storing instructions that when executed cause the at least one hardware controller to update the another of the storage installations in accordance with the software updates performed to the installation made active.

* * * * *